United States Patent
Sidebottom et al.

(10) Patent No.: US 9,565,103 B1
(45) Date of Patent: Feb. 7, 2017

(54) SYSTEMS AND METHODS FOR VIRTUALIZING CUSTOMER-PREMISES EQUIPMENT

(71) Applicant: Juniper Networks, Inc., Sunnyvale, CA (US)

(72) Inventors: Greg Sidebottom, Ottawa (CA); Jason R. Pascucci, Acton, MA (US); Raghavendra Mallya, Cupertino, CA (US); Paulo Lima, Kanata (CA); Steffen Ries, Ottawa (CA); Yue Gao, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 491 days.

(21) Appl. No.: 14/226,792

(22) Filed: Mar. 26, 2014

(51) Int. Cl.
  *G06F 15/173* (2006.01)
  *H04L 12/721* (2013.01)

(52) U.S. Cl.
  CPC .................................. *H04L 45/72* (2013.01)

(58) Field of Classification Search
  USPC ........................................................ 709/238
  See application file for complete search history.

(56) References Cited

U.S. PATENT DOCUMENTS

| | | | |
|---|---|---|---|
| 6,892,245 B1 * | 5/2005 | Crump | H04L 29/12066 709/223 |
| 7,752,334 B2 * | 7/2010 | Paunikar | H04L 29/12367 370/352 |
| 2002/0111998 A1 * | 8/2002 | Kim | H04L 29/12009 709/203 |
| 2006/0039386 A1 * | 2/2006 | Park | H04L 12/2803 370/401 |

OTHER PUBLICATIONS

Rekhter, Y., et al., "Address Allocation for Private Internets", https://tools.ietf.org/html/rfc1918, as accessed Jan. 21, 2014, Request for Comments: 1918, (Feb. 1996).

* cited by examiner

*Primary Examiner* — Hee Soo Kim
(74) *Attorney, Agent, or Firm* — FisherBroyles, LLP

(57) ABSTRACT

A computer-implemented method for virtualizing customer-premises equipment may include (1) receiving, at a service provider's network, at least one flow of network traffic from a remote device included in a user's private network, (2) identifying, within the flow of network traffic, at least one potentially non-unique private address that represents the remote device with respect to the user's private network, (3) determining at least one unique routable address that represents the remote device with respect to the service provider's network based at least in part on a network interface assigned to the user's private network and the potentially non-unique private address, and then (4) translating the potentially non-unique private address to the unique routable address to facilitate routing return network traffic to the remote device in connection with the flow of network traffic. Various other systems, methods, and computer-readable media are also disclosed.

20 Claims, 7 Drawing Sheets

SYSTEMS AND METHODS FOR VIRTUALIZING CUSTOMER-PREMISES EQUIPMENT

BACKGROUND

Internet Service Providers (ISPs) often provide their residential customers with fairly sophisticated customer-premises equipment (such as a home router) that facilitates access to the Internet and/or virtual services. Unfortunately, such customer-premises equipment may suffer from certain shortcomings and/or inefficiencies that have a negative impact on customer experience. For example, conventional customer-premises equipment may be relatively expensive. As a result, such customer-premises equipment may place a heavy financial burden on ISPs, which in turn pass on the expense to their customers.

Additionally or alternatively, conventional customer-premises equipment may be relatively complex and/or user-unfriendly. As a result, unsophisticated customers may be unable to configure such customer-premises equipment without professional assistance. Moreover, conventional customer-premises equipment may need periodic software and/or hardware upgrades to support new virtual services offered by the ISPs. As a result, the ISPs may need to periodically coordinate large-scale software and/or hardware rollouts that reach the majority of their customer bases.

The instant disclosure, therefore, identifies and addresses a need for systems and methods for virtualizing customer-premises equipment at ISP networks.

SUMMARY

As will be described in greater detail below, the instant disclosure generally relates to systems and methods for virtualizing customer-premises equipment. In one example, a computer-implemented method for virtualizing customer-premises equipment may include (1) receiving, at a service provider's network, at least one flow of network traffic from a remote device included in a user's private network, (2) identifying, within the flow of network traffic, at least one potentially non-unique private address that represents the remote device with respect to the user's private network, (3) determining at least one unique routable address that represents the remote device with respect to the service provider's network based at least in part on a network interface assigned to the user's private network and the potentially non-unique private address, and then in response to determining the unique routable address, (4) translating the potentially non-unique private address to the unique routable address to facilitate routing return network traffic to the remote device in connection with the flow of network traffic.

As another example, a system for implementing the above-described method may include (1) a reception module that receives, at a service provider's network, at least one flow of network traffic from a remote device included in a user's private network, (2) an identification module that identifies, within the flow of network traffic, at least one potentially non-unique private address that represents the remote device with respect to the user's private network, (3) a determination module that determines at least one unique routable address that represents the remote device with respect to the service provider's network based at least in part on a network interface assigned to the user's private network and the potentially non-unique private address, (4) a translation module that translates the potentially non-unique private address to the unique routable address to facilitate routing return network traffic to the remote device in connection with the flow of network traffic, and (5) at least one processor that executes the reception module, the identification module, the determination module, and the translation module.

In an additional example, the above-described method may be encoded as computer-readable instructions on a non-transitory computer-readable medium. For example, a computer-readable medium may include one or more computer-executable instructions that, when executed by at least one processor of a computing device, cause the computing device to (1) receive, at a service provider's network, at least one flow of network traffic from a remote device included in a user's private network, (2) identify, within the flow of network traffic, at least one potentially non-unique private address that represents the remote device with respect to the user's private network, (3) determine at least one unique routable address that represents the remote device with respect to the service provider's network based at least in part on a network interface assigned to the user's private network and the potentially non-unique private address, and then (4) translate the potentially non-unique private address to the unique routable address to facilitate routing return network traffic to the remote device in connection with the flow of network traffic.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
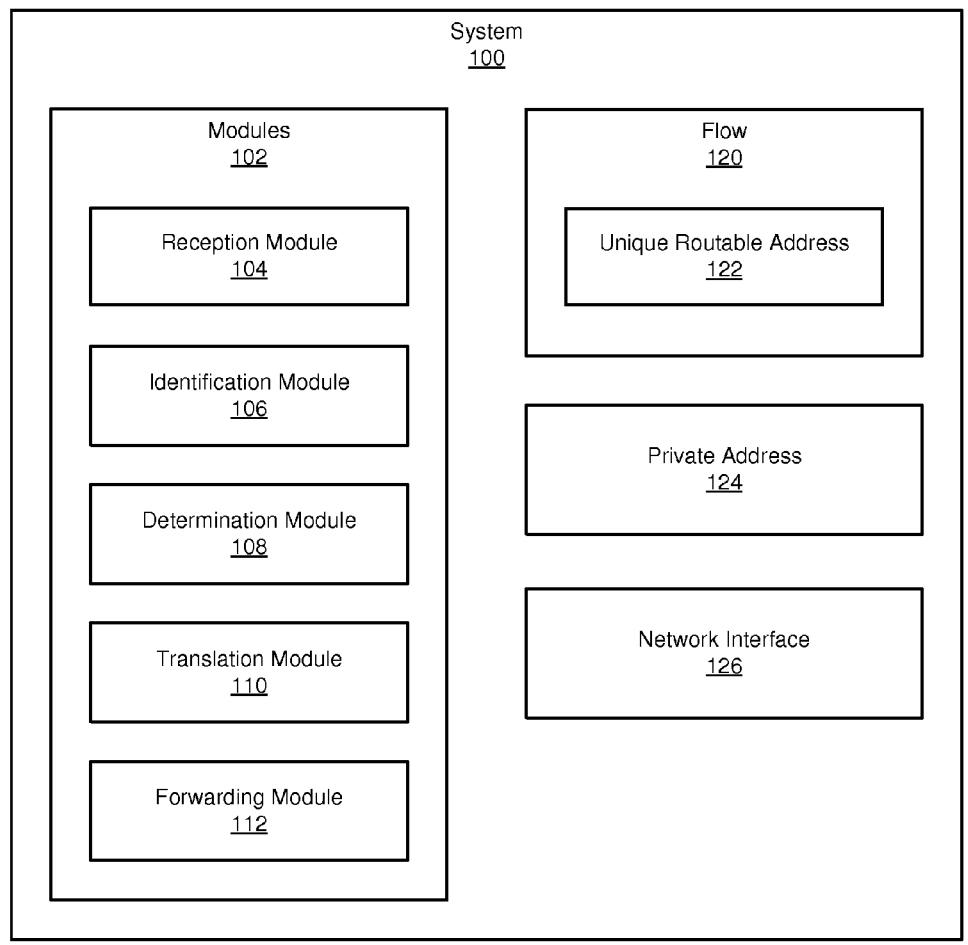
FIG. 1 is a block diagram of an exemplary system for virtualizing customer-premises equipment.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure describes various systems and methods for virtualizing customer-premises equipment. The phrase "customer-premises equipment," as used herein, generally refers to any type or form of device, terminal, and/or corresponding equipment that facilitates a connection with a service provider from a user's residence and/or property. Examples of such customer-premises equipment include, without limitation, routers, switches, firewalls, modems, telephones, residential gateways, virtual gateways, set-top boxes, home networking devices, combinations of one or more of the same, or any other suitable customer-premises equipment.

As will be explained in greater detail below, by maintaining a plurality of network interfaces that are each uniquely specific to a different private network, the various systems and methods described herein may distinguish one device assigned a private address by a user's private network from another device assigned the same private address by another user's private network. Similarly, by distinguishing the one device assigned the private address from the other device assigned the same private address, the various systems and methods described herein may be able to translate the same overlapping private address to and from different unique routable addresses within an ISP's network.

Moreover, by translating the same overlapping private address to and from different unique routable addresses within the ISP's network, the various systems and methods described herein may be able to virtualize the users' customer-premises equipment at the ISP's network. Finally, by virtualizing the users' customer-premises equipment at the ISP's network, the various systems and methods described herein may help reduce the users' and/or the ISP's equipment expenses, service expenses, and/or upgrade expenses.

Figure 2:
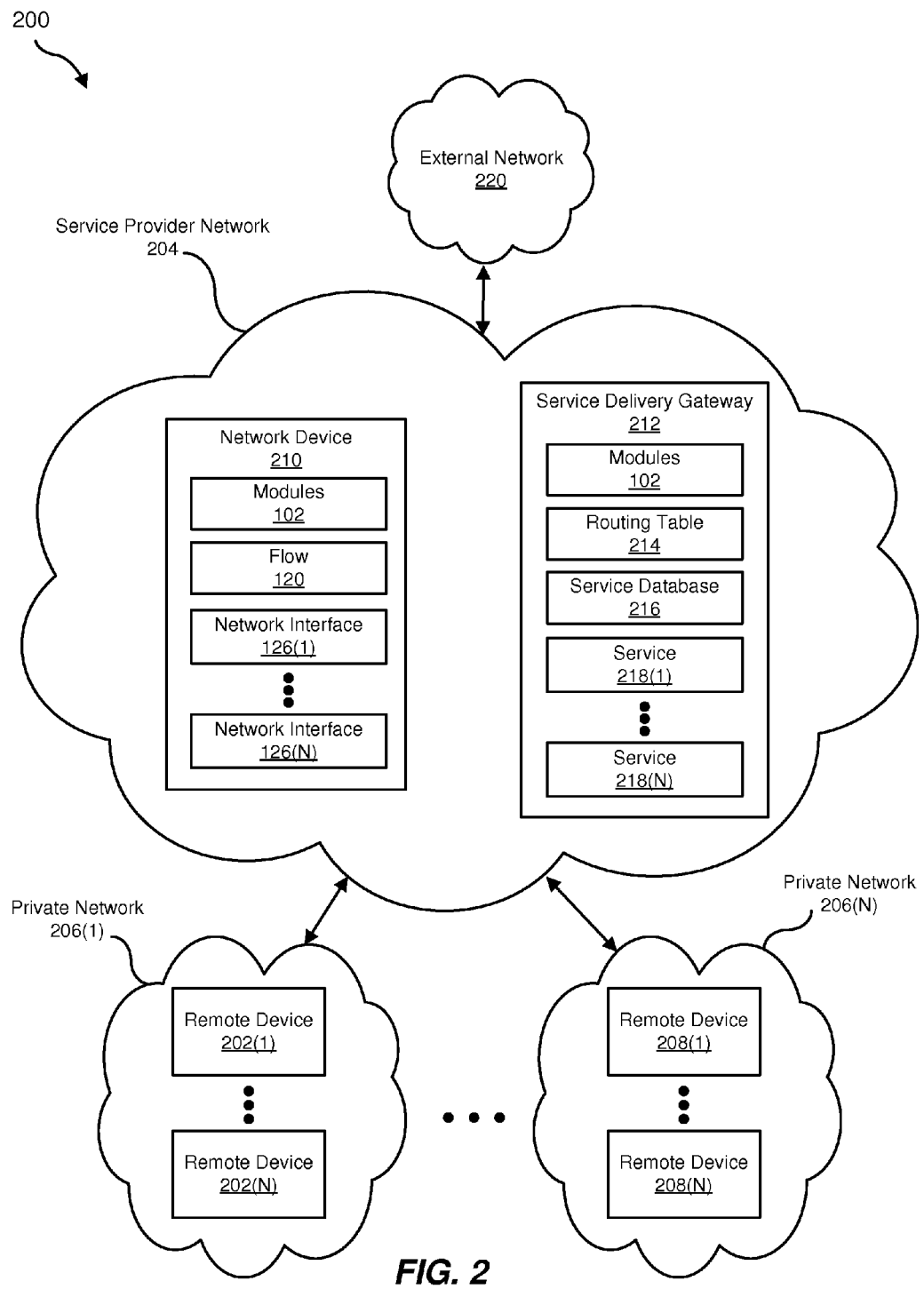
FIG. 2 is a block diagram of an exemplary system for virtualizing customer-premises equipment.
Figure 3:
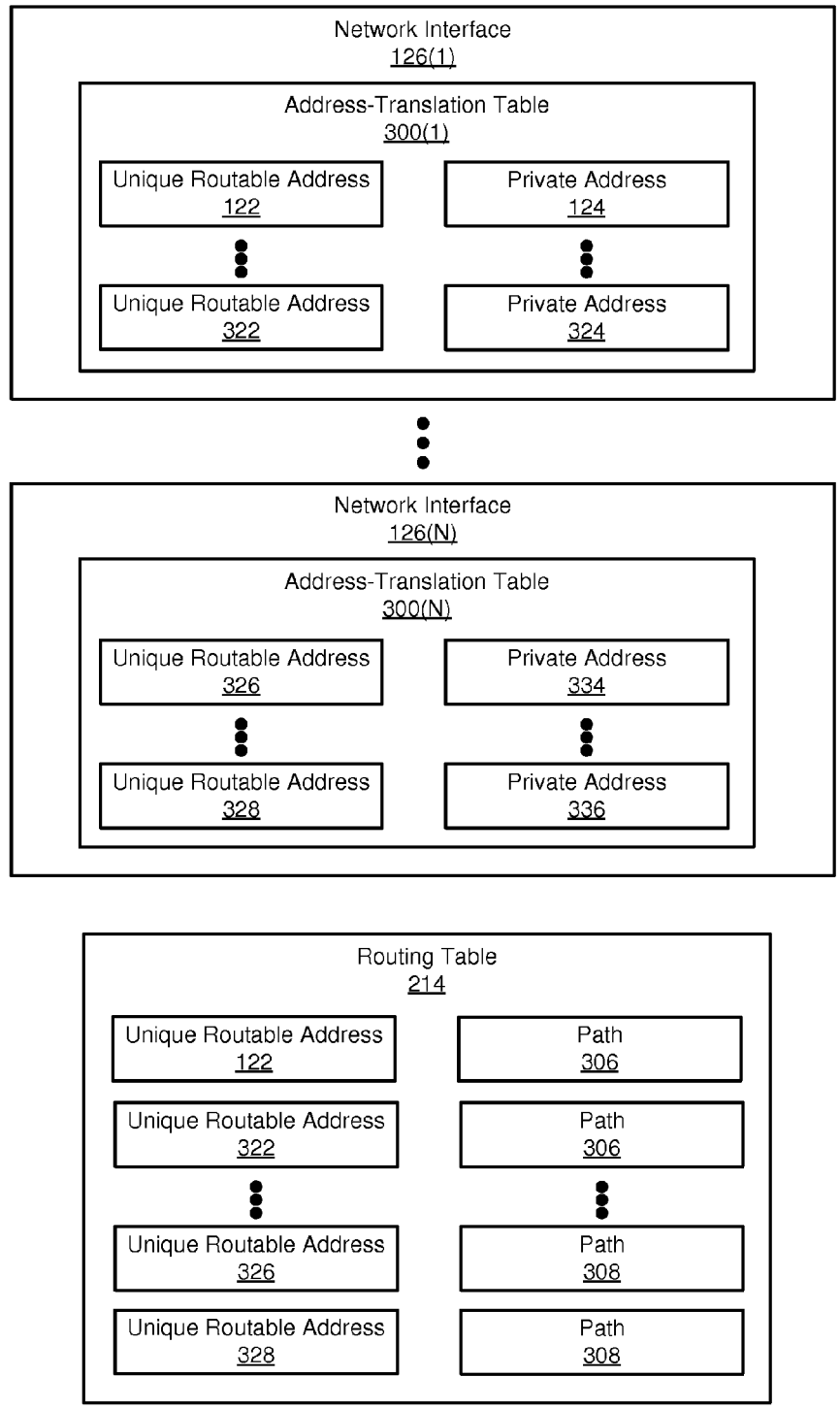
FIG. 3 is a block diagram of an exemplary system for virtualizing customer-premises equipment.

The following will provide, with reference to FIGS. 1-3, detailed descriptions of exemplary systems for virtualizing customer-premises equipment. Detailed descriptions of corresponding computer-implemented methods will be provided in connection with FIG. 4. Detailed descriptions of an exemplary flow and an exemplary address-translation tables will be provided in connection with FIG. 5. Detailed descriptions of another exemplary flow, an exemplary routing table, and an exemplary service database will be provided in connection with FIG. 6. In addition, detailed descriptions of an exemplary computing system capable of implementing one or more of the embodiments described herein will be provided in connection with FIG. 7.

FIG. 1 is a block diagram of an exemplary system 100 for virtualizing customer-premises equipment. As illustrated in this figure, exemplary system 100 may include one or more modules 102 for performing one or more tasks. For example, and as will be explained in greater detail below, exemplary system 100 may include a reception module 104 that receives, at a service provider's network, at least one flow of network traffic from a remote device included in a user's private network. Exemplary system 100 may also include an identification module 106 that identifies, within the flow of network traffic, at least one potentially non-unique private address that represents the remote device with respect to the user's private network.

In addition, exemplary system 100 may include a determination module 108 that determines at least one unique routable address that represents the remote device with respect to the service provider's network based at least in part on a network interface assigned to the user's private network and the potentially non-unique private address. Exemplary system 100 may further include a translation module 110 that translates the potentially non-unique private address to the unique routable address to facilitate routing return network traffic to the remote device in connection with the flow of network traffic.

Moreover, and as will be described in greater detail below, exemplary system 100 may include a forwarding module 112 that forwards the flow of network traffic to at a service delivery gateway included in the service provider's network to facilitate servicing the flow of network traffic. Although illustrated as separate elements, one or more of modules 102 in FIG. 1 may represent portions of a single module or application (such as JUNIPER NETWORKS' JUNOS, CISCO SYSTEMS' INTERNETWORK OPERATING SYSTEM (IOS), and/or ALCATEL-LUCENT'S SERVICE ROUTER OPERATING SYSTEM (SR OS)).

In certain embodiments, one or more of modules 102 in FIG. 1 may represent one or more software applications or programs that, when executed by a computing device, cause the computing device to perform one or more tasks. For example, and as will be described in greater detail below, one or more of modules 102 may represent software modules stored and configured to run on one or more computing devices, such as the devices illustrated in FIG. 2 (e.g., remote devices 202(1)-(N), remote devices 208(1)-(N), network device 210, and/or service delivery gateway 212), and/or computing system 700 in FIG. 7.

As illustrated in FIG. 1, exemplary system 100 may also include one or more flows, such as flow 120. The phrase "flow," as used herein, generally refers to any type or form of traffic and/or transfer of data within a network. In one embodiment, flow 120 may include data encapsulated in one or more packets. Examples of such packets include, without limitation, Internet Protocol (IP) version 4 (IPv4) packets, IP version 6 (IPv6) packets, Gateway-to-Gateway Protocol (GGP) packets, Internet Group Message Protocol (IGMP) packets, Transmission Control Protocol (TCP) packets, combinations of one or more of the same, or any other suitable packets.

As illustrated in FIG. 1, exemplary system 100 may also include one or more unique routable addresses, such as unique routable address 122. The phrase "unique routable address," as used herein, generally refers to any type or form of identifier that that identifies and/or represents a computing device with respect to a service provider's network. In one embodiment, unique routable address 122 may identify and/or represent a user's remote device included in the user's private network within the user's ISP network. Additionally or alternatively, unique routable address 122 may facilitate determining a path that leads to a network interface that corresponds to the user's private network. Examples of unique routable address 122 include, without limitation, IP addresses, IPv4 addresses, IPv6 addresses, client addresses, multicast addresses, combinations of one or more of the same, or any other suitable address.

As illustrated in FIG. 1, exemplary system 100 may also include one or more private addresses, such as private address 124. The phrase "private address," as used herein, generally refers to any type or form of identifier that identifies and/or represents a computing device with respect to a specific private network. In one embodiment, private address 124 may be unique with respect to a user's private network and potentially non-unique with respect to a service provider's network. Examples of private address 124 include, without limitation, IP addresses, IPv4 addresses, IPv6 addresses, client addresses, multicast addresses, combinations of one or more of the same, or any other suitable address.

As illustrated in FIG. 1, exemplary system 100 may also include one or more network interfaces, such as network interface 126. The phrase "network interface," as used herein, generally refers to any type or form of computing device and/or resource that facilitates network traffic within a network. In one embodiment, network interface 126 may be assigned to a user's private network. Additionally or alternatively, network interface 126 may be uniquely specific to the user's private network in a one-to-one relationship.

Examples of network interface 126 include, without limitation, physical ports, virtual ports, Virtual Local Area Networks (VLANs), Layer 2 interfaces, IPv4 interfaces, IPv6 interfaces, CCC interfaces, MPLS interfaces, line cards, physical interface cards, flexible physical interface card concentrators, module port concentrators, ingress and/or egress packet forwarding engines, packet processing engines, fabric switches, fabric inputs and/or outputs, Wide Area Network (WAN) inputs and/or outputs, portions of one or more of the same, combinations of one or more of the same, or any other suitable network interface.

Exemplary system 100 in FIG. 1 may be implemented in a variety of ways. For example, all or a portion of exemplary system 100 may represent portions of exemplary system 200 in FIG. 2. As shown in FIG. 2, system 200 may include a service provider network 204 in communication with one or more private networks 206(1)-(N) and/or external network 220.

In one embodiment, service provider network 204 may include a network device 210 and/or a service delivery gateway 212. In this embodiment, network device 210 may be programmed with one or more of modules 102. Additionally or alternatively, network device 210 may include flow 120 and/or one or more of network interfaces 126(1)-(N). Although illustrated as a single device in FIG. 2, network device 210 may represent a plurality of network devices included in service provider network 204.

In one embodiment, service delivery gateway 212 may be programmed with one or more of modules 102. Additionally or alternatively, service delivery gateway 212 may include a routing table 214, a service database 216, and/or one or more services 218(1)-(N). Although illustrated as a single device in FIG. 2, service delivery gateway 212 may represent a plurality of service delivery gateways included in service provider network 204.

The phrase "routing table," as used herein, generally refers to any type or form of table and/or database that specifies and/or identifies paths and/or hops that lead to interfaces within a network. As illustrated in FIG. 3, routing table 214 may include one or more of unique routable addresses 122, 322, 326, and 328. Additionally or alternatively, routing table 214 may identify path 306 that leads to network interface 126(1) and/or path 308 that leads to network interface 126(N). Routing table 214 may facilitate looking up one or more of paths 306 and 308 based at least in part on one or more of unique routable addresses 122, 322, 326, and 328.

The phrase "service database," as used herein, generally refers to any type or form of table and/or database that specifies and/or identifies services that correspond to specific computing devices. In one embodiment, service database 216 may include one or more Media Access Control (MAC) addresses of computing devices included in users' private networks. Additionally or alternatively, service database 216 may identify one or more of services 218(1)-(N) available and/or offered to the computing devices included in the users' private networks. Service database 216 may facilitate looking up one or more of services 218(1)-(N) offered and/or provided to the computing devices based at least in part on the corresponding MAC addresses of the devices. Although illustrated as part of service delivery gateway 212 in FIG. 2, service database 216 may additionally or alternatively represent part of a centralized management server (not illustrated in FIG. 2).

The term "service," as used herein, generally refers to any type or form of software application, mechanism, and/or policy offered and/or provided to computing devices. In one embodiment, services 218(1)-(N) may include one or more virtual and/or cloud-based services hosted by service delivery gateway 212. Examples of services 218(1)-(N) include, without limitation, device-specific policies, device-specific services, parental-controls policies, security services, anti-virus services, firewall services, media-delivery services, Video On Demand (VOD) services, Voice over IP (VoIP) services, IP TeleVision (IPTV) services, combinations of one or more of the same, or any other suitable services.

As illustrated in FIG. 3, network interfaces 126(1)-(N) may include address-translation tables 300(1)-(N), respectively. The phrase "address-translation table," as used herein, generally refers to any type or form of table and/or database that specifies and/or identifies relationships between private addresses and unique routable addresses. In one embodiment, address-translation table 300(1) may correspond and/or be specific to network interface 126(1). Address-translation table 300(1) may map unique routable addresses 122 and 322 to private addresses 124 and 324, respectively. Address-translation table 300(1) may also include one or more additional unique routable addresses and/or private addresses not illustrated in FIG. 3.

Similarly, address-translation table 300(N) may correspond and/or be specific to network interface 126(N). Address-translation table 300(N) may map unique routable addresses 326 and 328 to private addresses 334 and 336, respectively. Address-translation table 300(N) may also include one or more additional unique routable addresses and/or private addresses not illustrated in FIG. 3. As will be described in greater detail below, although all of unique routable addresses 122, 322, 326, and 328 may be unique with respect to one another, one or more of private addresses 124 and 324 may potentially overlap with one or more of private addresses 334 and 336.

In one embodiment, one or more of modules 102 from FIG. 1 may, when executed by one or more processors of network device 210, enable network device 210 to virtualize customer-premises equipment at service provider network 204. For example, and as will be described in greater detail below, one or more of modules 102 may cause network device 210 and/or service delivery gateway 212 to (1) receive, at service provider network 204, flow 120 from remote device 202(1) included in private network 206(1), (2) identify, within flow 120, private address 124 that represents remote device 202(1) with respect to private network 206(1), (3) determine that unique routable address 122 that represents remote device 202(1) with respect to service provider network 204 based at least in part on network interface 126(1) assigned to private network 206(1) and private address 124, and then in response to this determination, (4) translate private address 124 to unique routable address 122 to facilitate routing return network traffic to remote device 202(1) in connection with flow 120.

Network device 210 generally represents any type or form of computing device capable of directing and/or routing network traffic. In one embodiment, network device 210 may interface service provider network 204 with one or more of private networks 206(1)-(N). Examples of network device 210 include, without limitation, Broadband Remote Access Servers (BRASes), Broadband Network Gateways (BNGs), routers, switches, network hubs, gateways, network default gateways, nodes, servers, bridges, Field Programmable Gate Arrays (FPGAs), laptops, tablets, desktops, cellular phones, Personal Digital Assistants (PDAs), multimedia players, embedded systems, wearable devices (e.g., smart watches, smart glasses, etc.), gaming consoles, exemplary computing system 700 in FIG. 7, portions of one or more of the same, combinations of one or more of the same, or any other suitable network device.

Service delivery gateway 212 generally represents any type or form of computing device capable of hosting and/or delivering services. In one embodiment, service delivery gateway 212 may interface service provider network 204 with external network 220. Additionally or alternatively, service delivery gateway 212 may host and/or deliver one or more of services 218(1)-(N) to one or more of remote devices 202(1)-(N) via network interface 126(1). Examples of service delivery gateway 212 include, without limitation, BRASes, BNGs, routers, switches, network hubs, gateways, network default gateways, nodes, servers, bridges, FPGAs, laptops, tablets, desktops, cellular phones, PDAs, multimedia players, embedded systems, wearable devices, gaming consoles, exemplary computing system 700 in FIG. 7, portions of one or more of the same, combinations of one or more of the same, or any other suitable service delivery gateway.

Remote devices 202(1)-(N) and/or 208(1)-(N) generally represent any type or form of computing device capable of reading computer-executable instructions. In one embodiment, remote devices 202(1)-(N) and/or 208(1)-(N) may be located remotely with respect to service provider network 204. Remote devices 202(1)-(N) may correspond and/or belong to a specific user. Additionally or alternatively, remote devices 208(1)-(N) may correspond and/or belong to another specific user. Examples of remote devices 202(1)-(N) and/or 208(1)-(N) include, without limitation, laptops, tablets, desktops, servers, cellular phones, FPGAs, PDAs, multimedia players, embedded systems, wearable devices, gaming consoles, portions of one or more of the same, combinations of one or more of the same, exemplary computing system 700 in FIG. 7, or any other suitable computing devices.

Service provider network 204 generally represents any type or form of medium and/or architecture capable of facilitating communication or data transfer. In one embodiment, service provider network 204 may include wireless and/or wired connections. Examples of service provider network 204 include, without limitation, intranets, Wide Area Networks (WANs), Local Area Networks (LANs), Personal Area Networks (PANs), the Internet, ISP networks, wireline service provider networks, Power Line Communications (PLC) networks, cellular networks (e.g., Global System for Mobile Communications (GSM) networks), portions of one or more of the same, combinations of one or more of the same, or any other suitable service provider network.

Private networks 206(1)-(N) generally represent any type or form of medium and/or architecture capable of facilitating communication or data transfer. In one embodiment, private networks 206(1)-(N) may include wireless and/or wired connections. Private network 206(1) may represent a user's private home network. Additionally or alternatively, private network 206(N) may represent another user's private home network. Examples of private networks 206(1)-(N) include, without limitation, intranets, WANs, LANs, PANs, the Internet, ISP networks, wireline service provider networks, PLC networks, cellular networks, portions of one or more of the same, combinations of one or more of the same, or any other suitable private networks.

The term "user," as used herein, generally refers to any type or form of customer of an ISP. In one embodiment, a user may represent an individual customer of an ISP. Similarly, a user may represent a household of users of the ISP. Additionally or alternatively, a user may represent a business that subscribes to the ISP. Examples of such a user include, without limitation, individuals, households, families, customers, subscribers, companies, organizations, businesses, entities, portions of one or more of the same, combinations of one or more of the same, or any other suitable user.

External network 220 generally represents any type or form of medium and/or architecture capable of facilitating communication or data transfer. In one embodiment, external network 220 may include wireless and/or wired connections. Examples of external network 220 include, without limitation, intranets, WANs, LANs, PANs, the Internet, ISP networks, wireline service provider networks, PLC networks, cellular networks, portions of one or more of the same, combinations of one or more of the same, or any other suitable private networks.

Figure 4:
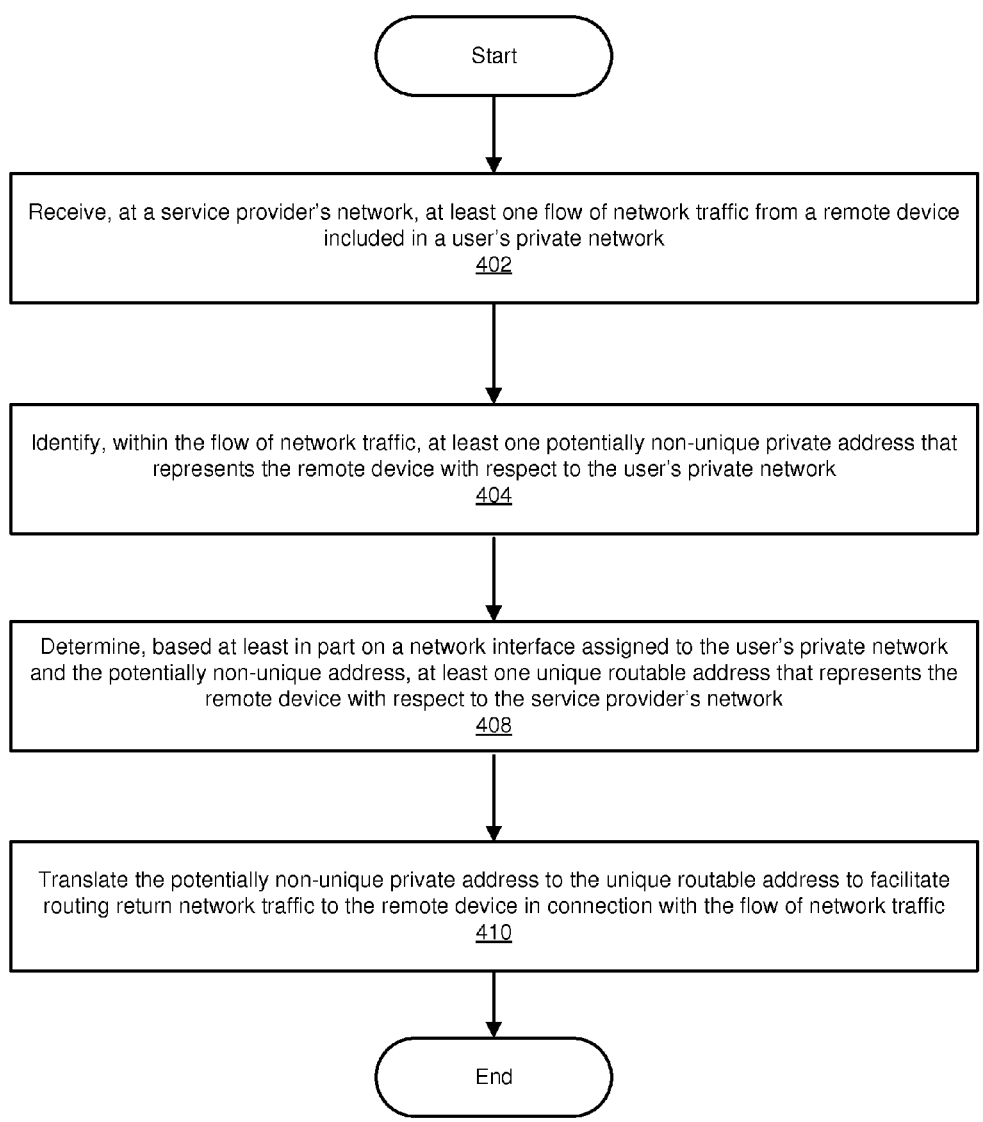
FIG. 4 is a flow diagram of an exemplary method virtualizing customer-premises equipment.

As illustrated in FIG. 4, at step 402 one or more of the systems described herein may receive at least one flow of network traffic from a remote device included in a user's private network. For example, reception module 104 may, as part of network device 210 in FIG. 2, receive flow 120 from remote device 202(1) included in private network 206(1). In this example, flow 120 may include one or more IPv4 packets. Additionally or alternatively, flow 120 may include one or more IPv6 packets.

The systems described herein may perform step 402 in a variety of ways. In some examples, reception module 104 may receive flow 120 from remote device 202(1) via network interface 126(1) assigned to private network 206(1). For example, computing device 202(1) may provide flow 120 to network device 210 via network interface 126(1). As flow 120 reaches network device 210 via network interface 126(1), reception module 104 may detect and/or receive flow 120.

Returning to FIG. 4, at step 404 one or more of the systems described herein may identify at least one potentially non-unique private address that represents the remote device with respect to the user's private network. For example, identification module 106 may, as part of network device 210 in FIG. 2, identify private address 124 within flow 120. In this example, private address 124 may represent remote device 202(1) with respect to and/or within private network 206(1). As will be described in greater detail below, private address 124 may be unique with respect to private network 206(1) and potentially non-unique with respect to service provider network 204.

The systems described herein may perform step 404 in a variety of ways. In some examples, identification module 106 may search flow 120 for a source address that identifies and/or represents the source of flow 120. For example, identification module 106 may search flow 120 for a header. During the search of flow 120, identification module 106 may identify a header in at least one packet included in flow 120. Identification module 106 may then identify private address 124 as the source address within this header.

The term "header," as used herein, generally refers to any type or form of data, metadata, and/or information that supplements the payload of a flow. Examples of such a header include, without limitation, IP headers, IPv4 headers, IPv6 headers, GGP headers, IGMP headers, TCP headers, combinations of one or more of the same, or any other suitable header.

Additionally or alternatively, identification module 106 may search flow 120 for a payload. During the search of flow 120, identification module 106 may identify a payload of at least one packet included in flow 120. Identification module 106 may then identify private address 124 as the source address within this payload.

The term "payload," as used herein, generally refers to any type or form of data and/or cargo included in the body of a flow. Additionally or alternatively, the payload may include data that represents the fundamental purpose for the transfer of the flow.

Figure 5:
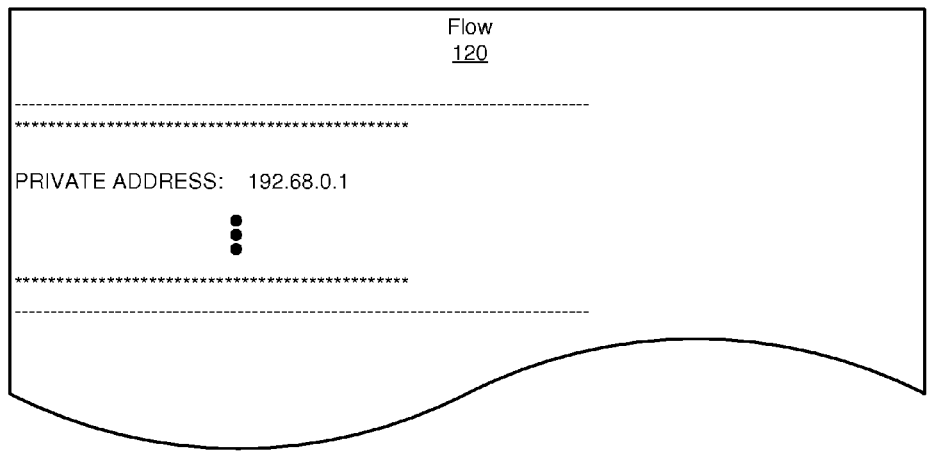
FIG. 5 is an illustration of an exemplary flow and an exemplary address-translation tables.

As a specific example, identification module 106 may search flow 120 in FIG. 5 for a source address that identifies and/or represents the source of flow 120. As illustrated in FIG. 5, flow 120 may include a private address (in this example, "192.68.0.1"). During the search of flow 120 in FIG. 5, identification module 106 may identify the "192.68.0.1" private address as the source address within flow 120.

Returning to FIG. 4, at step 406 one or more of the systems described herein may determine at least one unique routable address that represents the remote device with respect to the service provider's network based at least in part on a network interface assigned to the user's private network and the potentially non-unique private address. For example, determination module 108 may, as part of network device 210 in FIG. 2, determine that unique routable address 122 represents remote device 202(1) with respect to and/or within service provider network 204. In this example, determination module 108 may reach this determination based at least in part on network interface 126(1) and/or private address 124.

The systems described herein may perform step 406 in a variety of ways. In some examples, determination module 108 may use an address-translation table that specifies the unique routable address that represents remote device 202(1) with respect to service provider network 204. For example, network device 210 may maintain address-translation table 300(1) in FIG. 3 in connection with network interface 126(1) assigned to private network 206(1). In this example, identification module 106 may identify address-translation table 300(1) in FIG. 3.

Upon identification of address-translation table 300(1) in FIG. 3, determination module 108 may look up private address 124 in address-translation table 300(1). By looking up private address 124 in address-translation table 300(1), determination module 108 may identify unique routable address 122 as representing remote device 202(1) with respect to and/or within service provider network 204. Accordingly, determination module 108 may determine that unique routable address 122 represents remote device 202(1) with respect to and/or within service provider network 204.

As a specific example, identification module 106 may identify address-translation table 300(1) in FIG. 5. As illustrated in FIG. 5, address-translation table 300(1) may include a list of unique routable addresses (in this example, "162.16.234.1," "162.16.234.2," and "162.16.234.3") and a list of corresponding private addresses (in this example, "192.68.0.1," "192.68.0.2," and "192.68.0.3"). Upon identification of address-translation table 300(1) in FIG. 5, determination module 108 may look up the "192.68.0.1" private address in address-translation table 300(1). By looking up the "192.68.0.1" private address in address-translation table 300(1), determination module 108 may determine that the "162.16.234.1" unique routable address represents remote device 202(1) with respect to and/or within service provider network 204.

Returning to FIG. 4, at step 408 one or more of the systems described herein may translate the potentially non-unique private address to the unique routable address to facilitate routing return network traffic to the remote device in connection with the flow of network traffic. For example, translation module 110 may, as part of network device 210 in FIG. 2, translate private address 124 to unique routable address 122 to facilitate routing return network traffic to remote device 202(1) in connection with flow 120. In this example, translation module 110 may initiate this translation in response to the determination that unique routable address 122 represents remote device 202(1) with respect to and/or within service provider network 204.

The terms "translate" and "translation," as used herein, generally refer to any type or form of modification, conversion, and/or mapping of one address to another address. Examples of such translation include, without limitation, Network Address Translation (NAT), static NAT, static inline NAT, dynamic NAT, NAT444 translation, NAT464 translation, overloading translation, Port Address Translation (PAT), Network Address Port Translation (NAPT), overlapping translation, combinations of one or more of the same, or any other suitable translation.

The systems described herein may perform step 410 in a variety of ways. In some examples, translation module 110 may statically map private address 124 to unique routable address 122 based at least in part on address-translation table 300(1). For example, address-translation table 300(1) may identify at least one rule that controls the static mapping of private addresses 124 and 324 to unique routable addresses 122 and 322, respectively. In this example, translation module 110 may apply the rule identified by address-translation table 300(1) to private address 124. By applying this rule to private address 124, translation module 110 may statically map private address 124 to unique routable address 122.

Additionally or alternatively, address-translation table 300(1) may maintain a static mapping of private addresses 124 and 324 to unique routable addresses 122 and 322, respectively. In this example, translation module 110 may apply static NAT to private address 124 based at least in part on the static mapping maintained by address-translation table 300(1). By applying this static NAT to private address 124, translation module 110 may statically map private address 124 to unique routable address 122.

In one example, translation module 110 may perform static inline NAT on private address 124 at network device 210. In this example, the static inline NAT may accomplish translating private address 124 to unique routable address 122 without the need for any dynamic information about private address 124 and/or unique routable address 122. Accordingly, the static inline NAT may help reduce memory consumption by eliminating the need to store any dynamic information about private address 124 and/or unique routable address 122. By performing static inline NAT on private addresses at network device 210, translation module 110 may enable service provider network 204 to service a relatively large number of devices and/or private networks.

In some examples, translation module 110 may modify flow 120 during the translation. For example, translation module 110 may modify the header of at least one packet included in flow 120. As part of this modification, translation module 110 may replace private address 124 with unique routable address 122 within the header. In other words, translation module 110 may modify the source address within this header to identify unique routable address 122 as the source of flow 120.

In some examples, translation module 110 may also translate one or more other addresses and/or ports included in flow 120 at network device 210. For example, translation module 110 may represent all or a portion of an Application Layer Gateway (ALG) that translates public addresses (such as IPv4 and/or IPv6 addresses) used to identify the source and/or destination of flow 120 at network device 210. Additionally or alternatively, the ALG may translate one or more TCP and/or User Datagram Protocol (UDP) ports used to identify the source and/or destination of flow 120 at network device 210.

In addition to translating such addresses and/or ports included in a header of flow 120, the ALG may also translate one or more addresses and/or ports included in the payload of flow 120 at network device 210. For example, in the event that flow 120 is formatted in a protocol that embeds one or more addresses and/or ports within the payload, the ALG may perform static inline NAT on the payload of at least one packet included in flow 120 at network device 210. Examples of such a protocol include, without limitation, Dynamic Host Configuration Protocol (DHCP), File Transfer Protocol (FTP), Session Initiation Protocol (SIP), combinations of one or more of the same, or any other suitable protocol that embeds addresses and/or ports within the payload of a packet.

In some examples, one or more of the systems described herein may forward the flow of network traffic to a service delivery gateway included in the service provider's network. For example, forwarding module 112 may, as part of network device 210, forward flow 120 to service delivery gateway 212 included in service provider network 204. In this example, forwarding module 112 may direct network device 210 to provide flow 120 to service delivery gateway 212 via service provider network 204. By directing network device 210 to provide flow 120 to service delivery gateway 212, forwarding module 112 may enable service delivery gateway 212 to facilitate servicing flow 120.

As flow 120 reaches service delivery gateway 212, identification module 106 may, as part of service delivery gateway 212, identify at least one request for at least one of services 218(1)-(N) within flow 120. Upon identification of the request within flow 120, determination module 108 may, as part of service delivery gateway 212, determine the MAC address of the remote device that initiated flow 120 based at least in part on unique routable address 122. For example, determination module 108 may direct service delivery gateway 212 to query a policy server (not illustrated in FIG. 2) included in service provider network 204 for the MAC address of remote device 202(1). In response to this query, the policy server may determine that network device 210 includes the network interface assigned to private network 206(1). The policy server may then query network device 210 for the private address that identifies and/or represents remote device 202(1) based at least in part on unique routable address 122.

In response to this query, network device 210 may notify the policy server that private address 124 corresponds to remote device 202(1). Upon receiving this notification from network device 210, the policy server may determine the MAC address of remote device 202(1) based at least in part on private address 124. For example, the policy server may look up private address 124 in an Address Resolution Protocol (ARP) table that specifies the MAC address of remote device 202(1). In this example, by looking up private address 124 in the ARP table, the policy server may identify "3B-48-F4-38-CD-71" as the MAC address of remote device 202(1).

Upon identifying the MAC address of remote device 202(1), the policy server may notify service delivery gateway 212 of the MAC address of remote device 202(1). As service delivery gateway 212 receives the notification from the policy server, determination module 108 may determine that "3B-48-F4-38-CD-71" is the MAC address of remote device 202(1) based at least in part on this notification. Determination module 108 may then determine which, if any, of services 218(1)-(N) to provide to remote device 202(1) based at least in part on this MAC address.

Additionally or alternatively, identification module 106 may search flow 120 for the MAC address of the remote device that initiated flow 120. For example, in the event that unique routable address 122 is formatted in IPv6 (not illustrated in FIG. 5), translation module 110 may embed and/or encode "3B-48-F4-38-CD-71" in unique routable address 122 within flow 120 at network device 210. In this example, the "3B-48-F4-38-CD-71" portion of unique routable address 122 may represent the MAC address of remote device 202(1).

Upon identification of flow 120 at service delivery gateway 212, identification module 106 may search flow 120 for the MAC address of the remote device that initiated flow 120. During the search of flow 120, identification module 106 may identify the "3B-48-F4-38-CD-71" MAC address in unique routable address 122 within flow 120. Determination module 108 may then determine which, if any, of services 218(1)-(N) to provide to remote device 202(1) based at least in part on this MAC address.

Figure 6:
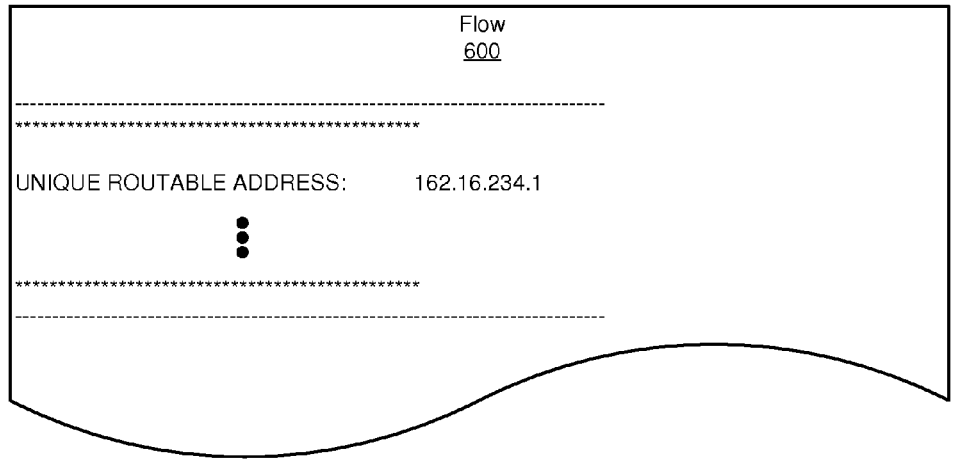
FIG. 6 is an illustration of another exemplary flow, an exemplary routing table, and an exemplary service database.

In one example, determination module 108 may use service database 216 in FIG. 6 to determine which, if any, of services 218(1)-(N) to provide to remote device 202(1). As illustrated in FIG. 6, service database 216 may include a list of MAC addresses (in this example, "A0-88-B4-78-4D-08," "3B-48-F4-38-CD-71," "21-18-A4-54-4E-EB" and so on) and a list of corresponding services (in this example, "Services 218(1), 218(3), and 218(4)," "Services 218(1)-(N)," and "N/A") available and/or offered to the respective MAC addresses. In this example, determination module 108 may look up the "3B-48-F4-38-CD-71" MAC address in service database 216. By looking up the "3B-48-F4-38-CD-71" MAC address in service database 216, determination module 108 may determine that all of services 218(1)-(N) are available and/or offered to remote device 202(1). In response to this determination, service delivery gateway 212 may provide one or more of services 218(1)-(N) to remote device 202(1) via network interface 126(1).

Additionally or alternatively, as flow 120 reaches service delivery gateway 212, determination module 108 may determine that flow 120 is destined for external network 220 (e.g., the Internet). In response to this determination, translation module 110 may translate unique routable address 122 to a globally routable address within flow 120. The phrase "globally routable address," as used herein, generally refers to any type or form of identifier that that identifies and/or represents a computing device with respect to an external network. Examples of such a globally routable address includes, without limitation, IP addresses, public IP addresses, globally routable unicast IP addresses, combinations of one or more of the same, or any other suitable globally routable address.

By translating unique routable address 122 to the globally routable address within flow 120, translation module 110 may enable external network 220 to route return network traffic to remote device 202(1) in connection with flow 120. Upon translation of unique routable address 122 to the globally routable address within flow 120, forwarding module 112 may forward flow 120 to external network 220.

In one example, translation module 110 may perform dynamic NAPT on unique routable address 122 at service delivery gateway 212. In this example, the dynamic NAPT may need certain dynamic information about unique routable address 122 and/or the globally routable address. Accordingly, the dynamic NAPT may consume memory at service delivery gateway 212 in storing the dynamic information about unique routable address 122 and/or the globally routable address.

In one example, service delivery gateway 212 may need modification to account for the static inline NAT performed at network device 210. For example, translation module 110 at service delivery gateway 212 may need to be aware of the static inline NAT performed at network device 210. Accordingly, service delivery gateway 212 may modify translation module 110 to be aware of the static inline NAT performed at network device 210. By modifying translation module 110 in this way, service delivery gateway 212 may account for the static inline NAT performed at network device 210 and/or ensure proper translation throughout service provider network 204.

In some examples, translation module 110 may also translate one or more other ports and/or addresses included in flow 120 at service delivery gateway 212. For example, translation module 110 may represent all or a portion of an ALG that translates public addresses (such as IPv4 and/or IPv6 addresses) used to identify the source and/or destination of flow 120 at service delivery gateway 212. Additionally or alternatively, this ALG may translate one or more TCP and/or UDP ports used to identify the source and/or destination of flow 120 at service delivery gateway 212.

In addition to translating such addresses and/or ports included in a header of flow 120, the ALG may also translate one or more addresses and/or ports included in the payload of flow 120 at service delivery device 212. For example, in the event that flow 120 is formatted in a protocol that embeds one or more addresses and/or ports within the payload, the ALG may perform dynamic NAPT on the payload of at least one packet included in flow 120 at service delivery device 212. Examples of such a protocol include, without limitation, DHCP, FTP, SIP, combinations of one or more of the same, or any other suitable protocol that embeds addresses and/or ports within the payload of a packet.

In some examples, reception module 104 may receive another flow of network traffic from another remote device included in another user's private network. For example, reception module 104 may, as part of network device 210 in FIG. 2, receive another flow from remote device 208(1) included in private network 206(N). Upon reception of the other flow at network device 210, identification module 106 may identify at least one potentially non-unique private address that represents remote device 208(1) with respect to private network 206(N).

In one example, identification module 106 may identify private address 334 within the other flow. In this example, network device 210 may maintain address-translation table 300(N) in FIG. 3 in connection with network interface 126(N) assigned to private network 206(N). Upon identification of private address 334, determination module 108 may use address-translation table 300(N) in FIG. 3 to determine a unique routable address that represents remote device 208(1) with respect to and/or within service provider network 204.

In one example, determination module 108 may look up private address 334 in address-translation table 300(N). By looking up private address 334 in address-translation table 300(N), determination module 108 may identify unique routable address 326 as representing remote device 208(1) with respect to and/or within service provider network 204. Accordingly, determination module 108 may determine that unique routable address 326 represents remote device 208(1) with respect to and/or within service provider network 204.

As illustrated in FIG. 5, address-translation table 300(N) may include a list of unique routable addresses (in this example, "164.18.239.1," "164.18.239.2," and "164.18.239.3") and a list of corresponding private addresses (in this example, "192.68.0.1," "192.68.0.2," and "192.68.0.3"). Upon identification of address-translation table 300(N) in FIG. 5, determination module 108 may look up the "192.68.0.1" private address in address-translation table 300(N). By looking up the "192.68.0.1" private address in address-translation table 300(1), determination module 108 may determine that the "164.18.239.1" unique routable address that represents remote device 208(1) with respect to and/or within service provider network 204.

In response to this determination, translation module 110 may translate private address 334 to unique routable address 326 to facilitate routing return network traffic to remote device 208(1) in connection with the other flow. Upon translation of private address 334 to unique routable address 326, forwarding module 112 may forward the other flow to service delivery gateway 212 via service provider network 204. For example, forwarding module 112 may direct network device 210 to provide the other flow to service delivery gateway 212. By directing network device 210 to provide the other flow to service delivery gateway 212, forwarding module 112 may enable service delivery gateway 212 to facilitate servicing the other flow.

In some examples, one or more of the systems described herein may receive at least one additional flow of network traffic destined for a remote device included in a user's private network. For example, reception module 104 may, as part of service delivery gateway 212 included in service provider network 204 in FIG. 2, receive a flow 600 in FIG. 6 destined for remote device 202(1) included in private network 206(1). In this example, flow 600 may originate at service delivery gateway 212 in connection with at least one of services 218(1)-(N) provided by service provider network 204.

Additionally or alternatively, flow 600 may originate from external network 220 (e.g., the Internet). In this case, translation module 110 may, as part of service delivery gateway 212 translate a globally routable address that represents computing device 202(1) with respect to and/or within external network 202 to unique routable address 122. By translating the globally routable address to unique routable address 122 within flow 120, translation module 110 may enable service delivery gateway 212 to route flow 600 to remote device 202(1) included in service provider network 204.

In some examples, one or more of the systems described herein may identify at least one unique routable address that represents the remote device with respect to the service provider's network. For example, identification module 106 may, as part of service delivery gateway 212 in FIG. 2, identify unique routable address 122 within flow 600. In this example, unique routable address 122 may represent remote device 202(1) with respect to and/or within service provider network 204.

In some examples, identification module 106 may search flow 600 for a destination address that identifies and/or represents the destination of flow 600. For example, identification module 106 may search flow 600 for a header. During the search of flow 600, identification module 106 may identify a header in at least one packet included in flow 600. Identification module 106 may then identify unique routable address 122 as the destination address within this header.

Additionally or alternatively, identification module 106 may search flow 600 for a payload. During the search of flow 600, identification module 106 may identify a payload of at least one packet included in flow 600. Identification module 106 may then identify unique routable address 122 as the destination address within this payload.

As a specific example, identification module 106 may search flow 600 in FIG. 6 for a destination address that identifies and/or represents the destination of flow 600. As illustrated in FIG. 6, flow 600 may include a unique routable address (in this example, "162.16.234.1"). During the search of flow 600 in FIG. 6, identification module 106 may identify the "162.16.234.1" unique routable address as the destination address within flow 600.

In some examples, unique routable address 122 may point to the network interface assigned to private network 206(1). For example, service provider network 204 may assign network interface 126(1) to private network 206(1). In this example, service provider network 204 may map unique routable address 122 to a path that leads to network interface 126(1). By mapping unique routable address 122 to this path, service provider network 204 may ensure that unique routable address 122 points to network interface 126(1) assigned to private network 206(1).

In some examples, one or more of the systems described herein may determine the network interface assigned to the user's private network based at least in part on the unique routable address. For example, determination module 108 may, as part of service delivery gateway 212 in FIG. 2, determine that network interface 126(1) is assigned to private network 206(1) based at least in part on unique routable address 122. In this example, network interface 126(1) may be uniquely specific to private network 206(1) in a one-to-one relationship.

In some examples, determination module 108 may use a routing table to determine that network interface 126(1) is assigned to private network 206(1). For example, identification module 106 may identify routing table 214 in FIG. 3. Upon identification of routing table 214 in FIG. 3, determination module 108 may look up unique routable address 122 in routing table 214. By looking up unique routable address 122 in routing table 214, determination module 108 may identify path 306 as leading to the network interface assigned to private network 206(1).

As indicated above, network interface 126(1) may be assigned to private network 206(1). Accordingly, path 306 may lead to network interface 126(1). In other words, by looking up unique routable address 122 in routing table 214, determination module 108 may determine that path 306 leads to network interface 126(1) assigned to private network 206(1).

As a specific example, identification module 106 may identify routing table 214 in FIG. 6. As illustrated in FIG. 6, routing table 214 may include a list of unique routable addresses (in this example, "162.16.234.1," "162.16.234.2," "162.16.234.3," "164.18.239.1," "164.18.239.2," "164.18.239.3," and so on) and a list of routes to corresponding network interfaces (in this example, "network interface 126(1)," "network interface 126(1)," "network interface 126(1)," "network interface 126(N)," "network interface 126(N)," "network interface 126(N)," and so on).

Upon identification of routing table 214 in FIG. 6, determination module 108 may look up the "162.16.234.1" unique routable address in routing table 214. By looking up the "162.16.234.1" unique routable address in routing table 214, determination module 108 may determine which path leads to the network interface assigned to private network 206(1).

As indicated above, network interface 126(1) may be assigned to private network 206(1). Accordingly, the determined path may lead to network interface 126(1). In other words, by looking up the "162.16.234.1" unique routable address in routing table 214, determination module 108 may determine the path that leads to private network 206(1).

In some examples, one or more of the systems described herein may forward the additional flow of network traffic to the network interface via the path specified in the routing table. For example, forwarding module 112 may, as part of service delivery gateway 212 in FIG. 2, forward flow 600 to network interface 126(1) via path 306 specified in the routing table 214 in FIG. 2. Network interface 126(1) may then receive flow 600 from forwarding module 112 via path 306.

In some examples, one or more of the systems described herein may determine at least one potentially non-unique private address that represents the remote device with respect to the user's private network based at least in part on the network interface and the unique routable address. For example, determination module 108 may, as part of network device 210, determine that private address 124 represents remote device 202(1) with respect to and/or within private network 206(1). In this example, determination module 108 may reach this determination based at least in part on network interface 126(1) and/or unique routable address 122.

In some examples, determination module 108 may use address-translation table 300(1) in FIG. 3 that specifies the potentially non-unique private address that represents remote device 202(1) with respect to private network 206(1). Upon identification of address-translation table 300(1) in FIG. 3, determination module 108 may look up unique routable address 122 in address-translation table 300(1). By looking up unique routable address 122 in address-translation table 300(1), determination module 108 may identify private address 124 as representing remote device 202(1) with respect to and/or within private network 206(1). Accordingly, determination module 108 may determine that private address 124 represents remote device 202(1) with respect to and/or within private network 206(1).

As a specific example, upon identification of address-translation table 300(1) in FIG. 6, determination module 108 may look up the "162.16.234.1" unique routable address in address-translation table 300(1). By looking up the "162.16.234.1" unique routable address in address-translation table 300(1), determination module 108 may determine that the "192.68.0.1" private address represents remote device 202(1) with respect to and/or within private network 206(1).

In some examples, one or more of the systems described herein may translate the unique routable address to the potentially non-unique private address to facilitate routing the additional flow of network traffic from the network interface to the remote device included in the user's private network. For example, translation module 110 may, as part of network device 210 in FIG. 2, translate unique routable address 122 to private address 124 to facilitate routing flow 600 from network interface 126(1) to remote device 202(1) included in private network 206(1). In this example, translation module 110 may initiate this translation in response to the determination that private address 124 represents remote device 202(1) with respect to and/or within private network 206(1).

In some examples, translation module 110 may statically map unique routable address 122 to private address 124 based at least in part on address-translation table 300(1). For example, address-translation table 300(1) may identify at least one rule that controls the static mapping of unique routable addresses 122 and 322 to private addresses 124 and 324, respectively. In this example, translation module 110 may apply the rule identified by address-translation table 300(1) to unique routable address 122. By applying this rule to unique routable address 122, translation module 110 may statically map unique routable address 122 to private address 124.

Additionally or alternatively, address-translation table 300(1) may maintain a static mapping of unique routable addresses 122 and 322 to private addresses 124 and 324, respectively. In this example, translation module 110 may apply static NAT to unique routable address 122 based at least in part on the static mapping maintained by address-translation table 300(1). By applying this static NAT to unique routable address 122, translation module 110 may statically map unique routable address 122 to private address 124.

In some examples, translation module 110 may modify flow 600 during the translation. For example, translation module 110 may modify the header of at least one packet included in flow 600. As part of this modification, translation module 110 may replace unique routable address 122 with private address 124 within the header. In other words, translation module 110 may modify the destination address within this header to identify private address 124 as the destination of flow 600.

Upon translation of unique routable address 122 to private address 124, forwarding module 112 may forward flow 600 to remote device 202(1) included in private network 206(1) via private address 124. For example, forwarding module 112 may direct network device 210 to provide flow 600 to private network 206(1) via service provider network 204. Private network 206(1) may then receive flow 600 from service provider network 204.

Upon receiving flow 600 from service provider network 204, private network 206(1) may search flow 600 for a header. During the search of flow 600, private network 206(1) may identify a header in at least one packet included in flow 600. Private network 206(1) may then identify private address 124 as the destination address within this header. Additionally or alternatively, private network 206(1) may provide flow 600 to remote device 202(1) based at least in part on private address 124.

As explained above in connection with exemplary method 400 in FIG. 4, an ISP may virtualize customer-premises equipment at the ISP's network. For example, an ISP's network may maintain network interfaces that are each uniquely specific to a different user's private network. By maintaining the network interface in this manner, the ISP's network may distinguish one device assigned a private address by a user's private network from another device assigned the same private address by another user's private network. Similarly, by distinguishing the one device assigned the private address from the other device assigned the same private address, the ISP's network may be able to translate the same overlapping private address to and from different unique routable addresses.

Moreover, by translating the same overlapping private address to and from different unique routable addresses, the ISP's network may be able to virtualize customer-premises equipment on behalf of the ISP's users. Finally, by virtualizing the customer-premises equipment, the ISP's network may help reduce the users' and/or the ISP's equipment expenses, service expenses, and/or upgrade expenses.

Figure 7:
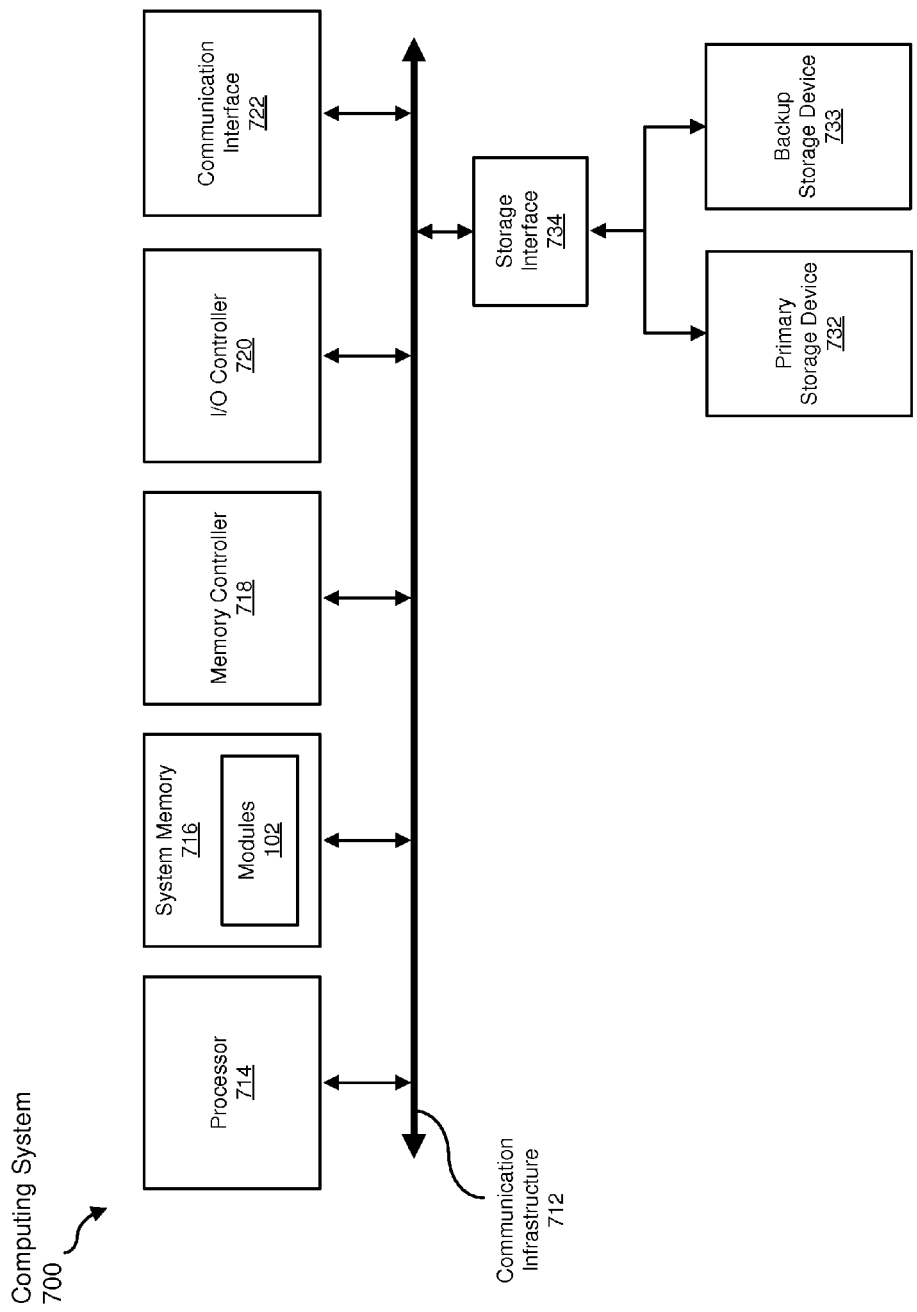
FIG. 7 is a block diagram of an exemplary computing system capable of implementing and/or being used in connection with one or more of the embodiments described and/or illustrated herein.

FIG. 7 is a block diagram of an exemplary computing system 700 capable of implementing and/or being used in connection with one or more of the embodiments described and/or illustrated herein. In some embodiments, all or a portion of computing system 700 may perform and/or be a means for performing, either alone or in combination with other elements, one or more of the steps described in connection with FIG. 4. All or a portion of computing system 700 may also perform and/or be a means for performing and/or implementing any other steps, methods, or processes described and/or illustrated herein.

Computing system 700 broadly represents any type or form of electrical load, including a single or multi-processor computing device or system capable of executing computer-readable instructions. Examples of computing system 700 include, without limitation, workstations, laptops, client-side terminals, servers, distributed computing systems, mobile devices, network switches, network routers (e.g., backbone routers, edge routers, core routers, mobile service routers, broadband routers, etc.), network appliances (e.g., network security appliances, network control appliances, network timing appliances, SSL VPN (Secure Sockets Layer Virtual Private Network) appliances, etc.), network controllers, gateways (e.g., service gateways, mobile packet gateways, multi-access gateways, security gateways, etc.), and/or any other type or form of computing system or device.

Computing system 700 may be programmed, configured, and/or otherwise designed to comply with one or more networking protocols. According to certain embodiments, computing system 700 may be designed to work with protocols of one or more layers of the Open Systems Interconnection (OSI) reference model, such as a physical layer protocol, a link layer protocol, a network layer protocol, a transport layer protocol, a session layer protocol, a presentation layer protocol, and/or an application layer protocol. For example, computing system 700 may include a network device configured according to a Universal Serial Bus (USB) protocol, an Institute of Electrical and Electronics Engineers (IEEE) 1394 protocol, an Ethernet protocol, a T1 protocol, a Synchronous Optical Networking (SONET) protocol, a Synchronous Digital Hierarchy (SDH) protocol, an Integrated Services Digital Network (ISDN) protocol, an Asynchronous Transfer Mode (ATM) protocol, a Point-to-Point Protocol (PPP), a Point-to-Point Protocol over Ethernet (PPPoE), a Point-to-Point Protocol over ATM (PPPoA), a Bluetooth protocol, an IEEE 802.XX protocol, a frame relay protocol, a token ring protocol, a spanning tree protocol, and/or any other suitable protocol.

Computing system 700 may include various network and/or computing components. For example, computing system 700 may include at least one processor 714 and a system memory 716. Processor 714 generally represents any type or form of processing unit capable of processing data or interpreting and executing instructions. Processor 714 may represent an application-specific integrated circuit (ASIC), a system on a chip (e.g., a network processor), a hardware accelerator, a general purpose processor, and/or any other suitable processing element.

Processor 714 may process data according to one or more of the networking protocols discussed above. For example, processor 714 may execute or implement a portion of a protocol stack, may process packets, may perform memory operations (e.g., queuing packets for later processing), may execute end-user applications, and/or may perform any other processing tasks.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 700 may include both a volatile memory unit (such as, for example, system memory 716) and a non-volatile storage device (such as, for example, primary storage device 732, as described in detail below). System memory 716 may be implemented as shared memory and/or distributed memory in a network device. Furthermore, system memory 716 may store packets and/or other information used in networking operations.

In certain embodiments, exemplary computing system 700 may also include one or more components or elements in addition to processor 714 and system memory 716. For example, as illustrated in FIG. 7, computing system 700 may include a memory controller 718, an Input/Output (I/O) controller 720, and a communication interface 722, each of which may be interconnected via communication infrastructure 712. Communication infrastructure 712 generally represents any type or form of infrastructure capable of facilitating communication between one or more components of a computing device. Examples of communication infrastructure 712 include, without limitation, a communication bus (such as a Serial ATA (SATA), an Industry Standard Architecture (ISA), a Peripheral Component Interconnect (PCI), a PCI Express (PCIe), and/or any other suitable bus), and a network.

Memory controller 718 generally represents any type or form of device capable of handling memory or data or controlling communication between one or more components of computing system 700. For example, in certain embodiments memory controller 718 may control communication between processor 714, system memory 716, and I/O controller 720 via communication infrastructure 712. In some embodiments, memory controller 718 may include a Direct Memory Access (DMA) unit that may transfer data (e.g., packets) to or from a link adapter.

I/O controller 720 generally represents any type or form of device or module capable of coordinating and/or controlling the input and output functions of a computing device. For example, in certain embodiments I/O controller 720 may control or facilitate transfer of data between one or more elements of computing system 700, such as processor 714, system memory 716, communication interface 722, and storage interface 730.

Communication interface 722 broadly represents any type or form of communication device or adapter capable of facilitating communication between exemplary computing system 700 and one or more additional devices. For example, in certain embodiments communication interface 722 may facilitate communication between computing system 700 and a private or public network including additional computing systems. Examples of communication interface 722 include, without limitation, a link adapter, a wired network interface (such as a network interface card), a wireless network interface (such as a wireless network interface card), and any other suitable interface. In at least one embodiment, communication interface 722 may provide a direct connection to a remote server via a direct link to a network, such as the Internet. Communication interface 722 may also indirectly provide such a connection through, for example, a LAN (such as an Ethernet network), a personal area network, a WAN, a private network (e.g., a virtual private network), a telephone or cable network, a cellular telephone connection, a satellite data connection, or any other suitable connection.

In certain embodiments, communication interface 722 may also represent a host adapter configured to facilitate communication between computing system 700 and one or more additional network or storage devices via an external bus or communications channel. Examples of host adapters include, without limitation, Small Computer System Interface (SCSI) host adapters, Universal Serial Bus (USB) host adapters, IEEE 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also enable computing system 700 to engage in distributed or remote computing. For example, communication interface 722 may receive instructions from a remote device or send instructions to a remote device for execution.

As illustrated in FIG. 7, exemplary computing system 700 may also include a primary storage device 732 and/or a backup storage device 734 coupled to communication infrastructure 712 via a storage interface 730. Storage devices 732 and 734 generally represent any type or form of storage device or medium capable of storing data and/or other computer-readable instructions. For example, storage devices 732 and 734 may represent a magnetic disk drive (e.g., a so-called hard drive), a solid state drive, a floppy disk drive, a magnetic tape drive, an optical disk drive, a flash drive, or the like. Storage interface 730 generally represents any type or form of interface or device for transferring data between storage devices 732 and 734 and other components of computing system 700.

In certain embodiments, storage devices 732 and 734 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 734 may also include other similar structures or devices for allowing computer software, data, or other computer-readable instructions to be loaded into computing system 700. For example, storage devices 732 and 734 may be configured to read and write software, data, or other computer-readable information. Storage devices 732 and 734 may be a part of computing system 700 or may be separate devices accessed through other interface systems.

Many other devices or subsystems may be connected to computing system 700. Conversely, all of the components and devices illustrated in FIG. 7 need not be present to practice the embodiments described and/or illustrated herein. The devices and subsystems referenced above may also be interconnected in different ways from those shown in FIG. 7. Computing system 700 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) and Digital Video Disks (DVDs)), electronic-storage media (e.g., solid-state drives and flash media), and other distribution systems.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of system 100 in FIG. 1 may represent portions of a cloud-computing or network-based environment. Cloud-computing and network-based environments may provide various services and applications via the Internet. These cloud-computing and network-based services (e.g., software as a service, platform as a service, infrastructure as a service, etc.) may be accessible through a web browser or other remote interface. Various functions described herein may also provide network switching capabilities, gateway access capabilities, network security functions, content caching and delivery services for a network, network control services, and/or and other networking functionality.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for virtualizing customer-premises equipment, at least a portion of the method being performed by a computing device comprising at least one processor, the method comprising:
   receiving, at a service provider's network, at least one flow of network traffic from a remote device included in a user's private network;
   identifying, within the flow of network traffic, at least one potentially non-unique private address that represents the remote device with respect to the user's private network;
   determining, based at least in part on a network interface assigned to the user's private network and the potentially non-unique private address, at least one unique routable address that represents the remote device with respect to the service provider's network;
   in response to determining the unique routable address, translating the potentially non-unique private address to the unique routable address to facilitate routing return network traffic to the remote device in connection with the flow of network traffic.

2. The method of claim 1, wherein determining the unique routable address that represents the remote device with respect to the service provider's network comprises:
   identifying, at the network interface assigned to the user's private network, an address-translation table that specifies the unique routable address that represents the remote device with respect to the service provider's network;
   determining, by looking up the potentially non-unique private address in the address-translation table, the unique routable address.

3. The method of claim 2, wherein identifying the address-translation table that specifies the unique routable address comprises maintaining the address-translation table in connection with the network interface assigned to the user's private network.

4. The method of claim 1, further comprising, upon translating the potentially non-unique private address to the unique routable address, forwarding the flow of network traffic to at a service delivery gateway included in the service provider's network to facilitate servicing the flow of network traffic.

5. The method of claim 4, further comprising:
   identifying, within the flow of network traffic at the service delivery gateway, at least one request for a device-specific service provided by the service provider's network;
   determining, based at least in part on the unique routable address, a media access control address of the remote device included in the user's private network;
   determining, based at least in part on the request and the media access control address of the remote device, the device-specific service that corresponds to the remote device included in the user's private network;

in response to determining the device-specific service, providing the device-specific service to the remote device via the network interface.

6. The method of claim 4, further comprising:

determining, at the service delivery gateway, that the flow of network traffic is destined for the Internet;

in response to determining that the flow of network traffic is destined for the Internet, translating the unique routable address to a globally routable address to enable the Internet to route return network traffic to the remote device in connection with the flow of network traffic;

upon translating the unique routable address to a globally routable address, forwarding the flow of network traffic to the Internet to facilitate servicing the flow of network traffic.

7. The method of claim 1, further comprising:

receiving, at the service provider's network, at least one additional flow of network traffic destined for a remote device included in the user's private network;

identifying, within the additional flow of network traffic, the unique routable address that represents the remote device with respect to the service provider's network;

determining, based at least in part on the unique routable address, that the network interface is assigned to the user's private network;

determining, based at least in part on the network interface and the unique routable address, the potentially non-unique private address that represents the remote device with respect to the user's private network;

in response to determining the potentially non-unique private address, translating the unique routable address to the potentially non-unique private address to facilitate routing the additional flow of network traffic from the network interface to the remote device included in the user's private network.

8. The method of claim 1, wherein identifying the unique routable address that represents the remote device with respect to the service provider's network comprises identifying a unique routable address that points to the network interface assigned to the user's private network.

9. The method of claim 8, wherein determining that the network interface is assigned to the user's private network comprises:

identifying, at a service delivery gateway included in the service provider's network, a routing table that specifies a path that leads to the network interface assigned to the user's private network;

determining, by looking up the unique routable address in the routing table, the path that leads to the network interface assigned to the user's private network;

the method further comprises, upon determining the path that leads to the network interface, forwarding the additional flow of network traffic to the network interface via the path specified in the routing table.

10. The method of claim 7, further comprising, upon translating the unique routable address to the potentially non-unique private address, forwarding the additional flow of network traffic to the remote device included in the user's private network via the potentially non-unique private address.

11. The method of claim 1, further comprising:

receiving, at the service provider's network, at least one additional flow of network traffic from an additional remote device included in an additional user's private network;

identifying, within the additional flow of network traffic, at least one additional potentially non-unique private address that represents the remote device with respect to the additional user's private network;

determining, based at least in part on an additional network interface assigned to the additional user's private network and the additional potentially non-unique private address, at least one additional unique routable address that represents the additional remote device with respect to the service provider's network;

in response to determining the additional unique routable address, translating the additional potentially non-unique private address to the additional unique routable address to facilitate routing return network traffic to the additional remote device in connection with the additional flow of network traffic.

12. The method of claim 1, wherein translating the potentially non-unique private address to the unique routable address comprises statically mapping the potentially non-unique private address to the unique routable address.

13. The method of claim 1, wherein the flow of network traffic received from the remote device comprises at least one of:

at least one packet destined for the Internet;

at least one packet destined for a service delivery gateway included in the service provider's network in connection with a service provided by the service provider's network.

14. The method of claim 13, wherein the service provided by the service provider's network comprises at least one of:

a device-specific parental-controls policy;

a device-specific media-delivery service.

15. The method of claim 1, wherein the potentially non-unique private address comprises an address that is unique with respect to the user's private network and non-unique with respect to the service provider's network.

16. The method of claim 1, wherein the network interface assigned to the user's private network comprises a network interface that is uniquely specific to the user's private network in a one-to-one relationship.

17. A system for virtualizing customer-premises equipment, the system comprising:

a reception module that receives, at a service provider's network, at least one flow of network traffic from a remote device included in a user's private network;

an identification module that identifies, within the flow of network traffic, at least one potentially non-unique private address that represents the remote device with respect to the user's private network;

a determination module that determines, based at least in part on a network interface assigned to the user's private network and the potentially non-unique private address, at least one unique routable address that represents the remote device with respect to the service provider's network;

a translation module that translates the potentially non-unique private address to the unique routable address to facilitate routing return network traffic to the remote device in connection with the flow of network traffic;

at least one processor that executes the reception module, the identification module, the determination module, and the translation module.

18. The system of claim 17, wherein:
- the identification module identifies, at the network interface assigned to the user's private network, an address-translation table that specifies the unique routable address that represents the remote device with respect to the service provider's network;
- the determination module determines, by looking up the potentially non-unique private address in the address-translation table, the unique routable address.

19. The system of claim 17, further comprising a forwarding module that forwards the flow of network traffic to at a service delivery gateway included in the service provider's network to facilitate servicing the flow of network traffic.

20. A non-transitory computer-readable medium comprising one or more computer-executable instructions that, when executed by at least one processor of a computing device, cause the computing device to:

- receive, at a service provider's network, at least one flow of network traffic from a remote device included in a user's private network;
- identify, within the flow of network traffic, at least one potentially non-unique private address that represents the remote device with respect to the user's private network;
- determine, based at least in part on a network interface assigned to the user's private network and the potentially non-unique private address, at least one unique routable address that represents the remote device with respect to the service provider's network;
- translate the potentially non-unique private address to the unique routable address to facilitate routing return network traffic to the remote device in connection with the flow of network traffic.

* * * * *